United States Patent
Massari et al.

(10) Patent No.: US 11,173,530 B2
(45) Date of Patent: Nov. 16, 2021

(54) METHOD FOR CLEANING AN EXTRUSION DIE

(71) Applicant: Isinnova S.r.l., Brescia (IT)

(72) Inventors: Marco Massari, Bagnolo Mella (IT); Matteo Tortelli, Flero (IT); Marco Tortelli, Flero (IT); Cristian Fracassi, Passano Bresciano (IT)

( * ) Notice: Subject to any disclaimer, the term of this patent is extended or adjusted under 35 U.S.C. 154(b) by 43 days.

(21) Appl. No.: 16/627,895

(22) PCT Filed: May 31, 2018

(86) PCT No.: PCT/IB2018/053875
§ 371 (c)(1),
(2) Date: Dec. 31, 2019

(87) PCT Pub. No.: WO2019/012340
PCT Pub. Date: Jan. 17, 2019

(65) Prior Publication Data
US 2020/0164420 A1 May 28, 2020

(30) Foreign Application Priority Data

Jul. 14, 2017 (IT) .......... 102017000080011

(51) Int. Cl.
*B21C 35/06* (2006.01)
*B21C 35/04* (2006.01)
(Continued)

(52) U.S. Cl.
CPC ............ *B21C 35/04* (2013.01); *B21C 23/218* (2013.01); *B21C 35/06* (2013.01); *B29C 48/272* (2019.02);
(Continued)

(58) Field of Classification Search
CPC ....... B21C 23/218; B21C 25/06; B21C 26/00; B21C 35/00; B21C 35/06; B21C 35/04;
(Continued)

(56) References Cited

U.S. PATENT DOCUMENTS 2,047,237 A * 7/1936 Updegraff ............... B21C 23/32
72/38
2,539,564 A * 1/1951 Barrett .................... B21C 35/04
72/255

(Continued)

FOREIGN PATENT DOCUMENTS

CN 102389909 6/2014
CN 105195546 4/2017

*Primary Examiner* — Edward T Tolan
(74) *Attorney, Agent, or Firm* — Themis Law

(57) ABSTRACT

A method of cleaning an extrusion die from residual metal remaining after an extrusion process at a temperature below 600° C. and of recovering the residual metal includes providing a thrust member with at least one portion made of a polymeric material at the extrusion die; reciprocally moving the thrust member and the die; removing polymeric material not flowed out of the die during the preceding step; mechanically and/or chemically removing the residual metal not flowed out from the die during the moving step; and opening the extrusion die. The polymeric material in the moving step has a water content lower than 7% by weight with respect to the total weight of the polymeric material. During the moving step, the polymeric material is at least partially in a plastic deformation condition or melted so as to occupy the volume of the residual metal flowed out of the extrusion die.

12 Claims, 2 Drawing Sheets

(51) Int. Cl.
*B21C 23/21* (2006.01)
*B29C 48/30* (2019.01)
*B29C 48/27* (2019.01)

(52) U.S. Cl.
CPC .... *B29C 48/30* (2019.02); *B29C 2948/92704* (2019.02)

(58) Field of Classification Search
CPC . B29C 33/72; B29C 2033/727; B29C 48/272; B08B 7/0014; B28B 7/236
See application file for complete search history.

(56) References Cited

U.S. PATENT DOCUMENTS

| | | | | |
|---|---|---|---|---|
| 3,072,251 A | * | 1/1963 | Sauve | B21C 23/32 |
| | | | | 72/42 |
| 3,084,075 A | * | 4/1963 | Doan | B08B 9/00 |
| | | | | 134/8 |
| 3,097,742 A | * | 7/1963 | Lamberty | B21C 23/32 |
| | | | | 72/42 |
| 3,342,638 A | * | 9/1967 | Wanzenberg | B29B 17/02 |
| | | | | 75/403 |
| 3,798,064 A | * | 3/1974 | Amoser | B29C 48/27 |
| | | | | 134/7 |
| 3,919,870 A | * | 11/1975 | Wassen | B21C 35/04 |
| | | | | 72/39 |
| 4,116,030 A | * | 9/1978 | Kobayashi | B21C 23/08 |
| | | | | 72/253.1 |
| 4,976,788 A | * | 12/1990 | Nohr | B29C 33/722 |
| | | | | 134/5 |
| 7,040,327 B2 | * | 5/2006 | Wada | B08B 3/02 |
| | | | | 134/22.1 |
| 8,431,650 B2 | * | 4/2013 | Dean | C08L 23/06 |
| | | | | 525/191 |
| 2003/0221707 A1 | * | 12/2003 | Blanton | C08K 9/00 |
| | | | | 134/7 |
| 2010/0164131 A1 | | 7/2010 | Bookbinder | |

* cited by examiner

METHOD FOR CLEANING AN EXTRUSION DIE

FIELD OF THE INVENTION

The present invention is generally applicable to the technical field of metallurgy and it particularly relates to a method to clean an extrusion die from the residual metal that remains therein after one or more extrusion processes at a temperature below 600° C. and to recover the residual metal thereof.

BACKGROUND OF THE INVENTION

The dies of extrusion systems of metal, for example aluminium, brass, steel, copper or the like, after a certain number of extrusion processes or, in any case, at any change of production, need to be removed from the system to be cleaned and/or for the maintenance.

Generally, such dies consist of several reciprocally coupled parts so as profiles having sections with complex geometry and/or closed perimeters may be obtained.

However, it is known that the metal remaining in such dies after an extrusion process, solidifying, prevents the opening of the same dies, operation that is necessary for the maintenance and the restoration of the surfaces in contact with the extruded metal.

In order to remove such extrusion residual, the entire extrusion head comprising the die is removed from the system.

In particular, with regards to aluminium, the cleaning operation is accomplished by chemically removing the metal by immersing the die in a sodium hydroxide solution at a predetermined temperature for a predetermined period of time, generally of 6 to 24 hours and at the temperature of 80° C.-90° C.

Such an operation requires a considerable waste of materials and energy with an evident increase of costs.

Furthermore, as a result of such an operation, a mud mainly containing various sodium aluminates in caustic soda is obtained. Such a mud is a special industrial waste to be disposed ad hoc and, therefore, it is a further increase of costs.

Moreover, as it is evident, the entire process has a very high environmental impact.

The high amount of sodium hydroxide used in such an operation requires particularly high attention and expertise as the sodium hydroxide and, therefore, the mud are highly caustic.

A further drawback of such known method is the impossibility of recovery the metal from the mud. Such a drawback is a further, important increase in costs.

It is estimated that the cleaning process of the residues that remain in the aluminium extrusion dies and the disposal thereof has an average cost for an Italian company of about € 400,000.

SUMMARY OF THE INVENTION

Object of the present invention is to at least partially overcome the above mentioned drawbacks, by providing a particularly effective method to clean an extrusion die from the residual metal that remains therein after one or more extrusion processes.

Another object of the present invention is to provide a method to clean an extrusion die that allows to recover the metal that remains therein.

Another object of the present invention is to provide a method to clean an extrusion die from the residual metal that remains therein after one or more extrusion processes that is particularly cheap.

Another object of the present invention is to provide a method to clean an extrusion die having a minimal environmental impact.

Another object of the present invention is to provide a method to clean an extrusion die that generally requires a shorter time for the restoration of the extrusion die.

Another object of the present invention is to provide a method to clean an extrusion die having a limited expenditure of energy.

Such objects, as well as others that will be clearer hereinafter, are fulfilled by a method to clean an extrusion die from the residual metal that remains therein after one or more extrusion processes having one or more of the features herein described, shown and/or claimed.

Advantageous embodiments of the invention are described in the appended claims.

BRIEF DESCRIPTION OF THE DRAWINGS

Further features and advantages of the invention will become clearer by reading the detailed description of a preferred but not exclusive embodiment of a method to clean an extrusion die shown by way of non-limitative example with the help of the annexed drawings, wherein.

DETAILED DESCRIPTION OF A PREFERRED EMBODIMENT

Figure 1A:
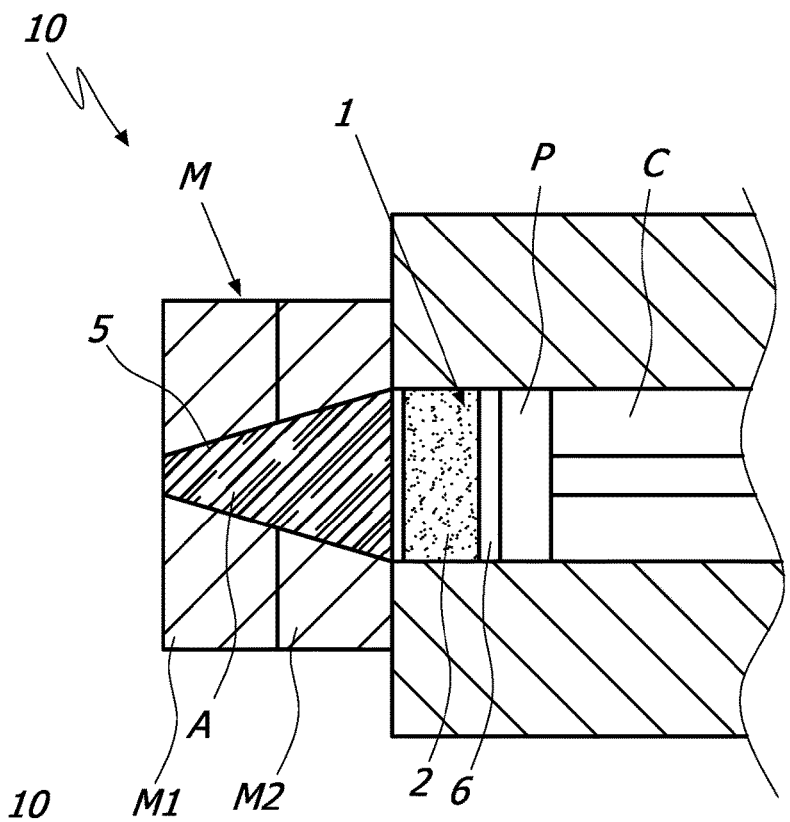
FIGS. 1a, 1b and 1c are a section view of an extrusion head 10 in different operating phases.

With reference to the above mentioned figures, a method is described to clean an extrusion die M from the residual metal A that remains therein after one or more extrusion processes at a temperature below 600° C. in an extrusion system. In particular, the method according to the invention is suitable for extrusion systems of aluminium or alloys thereof. Moreover, it may be advantageously used also in systems to extrude other metals, for example zinc, lead or tin or alloys thereof.

In particular, with "extrusion process" it is meant one or more extrusions after which it is necessary to at least partially remove the residues A, for example, due to the need to change the material to be extruded, the geometry of the extruded section or after a high number of extrusions.

Moreover, the method according to the invention may allow the recovery of aluminium, for example by means of a step of accumulation of the residual aluminium A and, possibly, a treatment step thereof so as the residual aluminium may be recycled and reused. For example, the latter may enter in the secondary aluminium production chain.

Usually, the extrusion systems have an extrusion head 10 that may comprise a die M that gives the final shape to the extruded piece. The die M in a per se known manner may be formed by two or more parts M1, M2, that may be removably coupled therebetween. Therefore, the parts M1, M2 may be separated to the need.

In a per se known manner, the aluminium to be extruded is loaded in the extrusion press generally in the form of a billet, that may possibly be preheated at a temperature of about 400-450° C. and subsequently pushed by a thrust member or plunger P against the die M in order to obtain the finished piece, generally a bar or a continuous profile.

In contact with the aluminium, between the plunger P and the same aluminium it is interposed a wear working block 6 generally called "dummy block".

Although in the present text it is described an extrusion by a system wherein the direction of the extruded flow is substantially equal to the forwarding direction of the thrust member or plunger P (the so-called "direct extrusion"), the same method may be used in a system wherein the direction of the extruded flow is substantially opposite to the forwarding direction of the thrust member or plunger P (the so-called "indirect extrusion").

The die M may have an inner chamber 5 shown in the drawings for simplicity with a substantially frusto-conical or cuneiform shape susceptible to act as a guide for the aluminium to be extruded. Moreover, the inner chamber 5 may have more complex geometrical shapes that are not shown in the annexed drawings, for example when it is necessary to extrude tubular profiles or profiles having particular shapes.

Figure 1B:
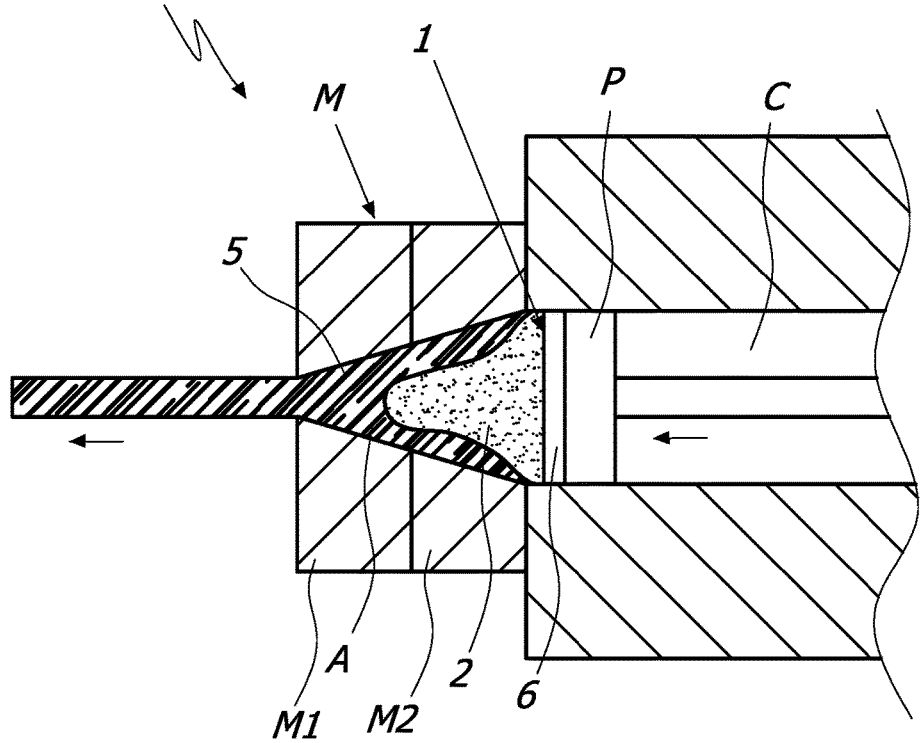
Figure 1C:
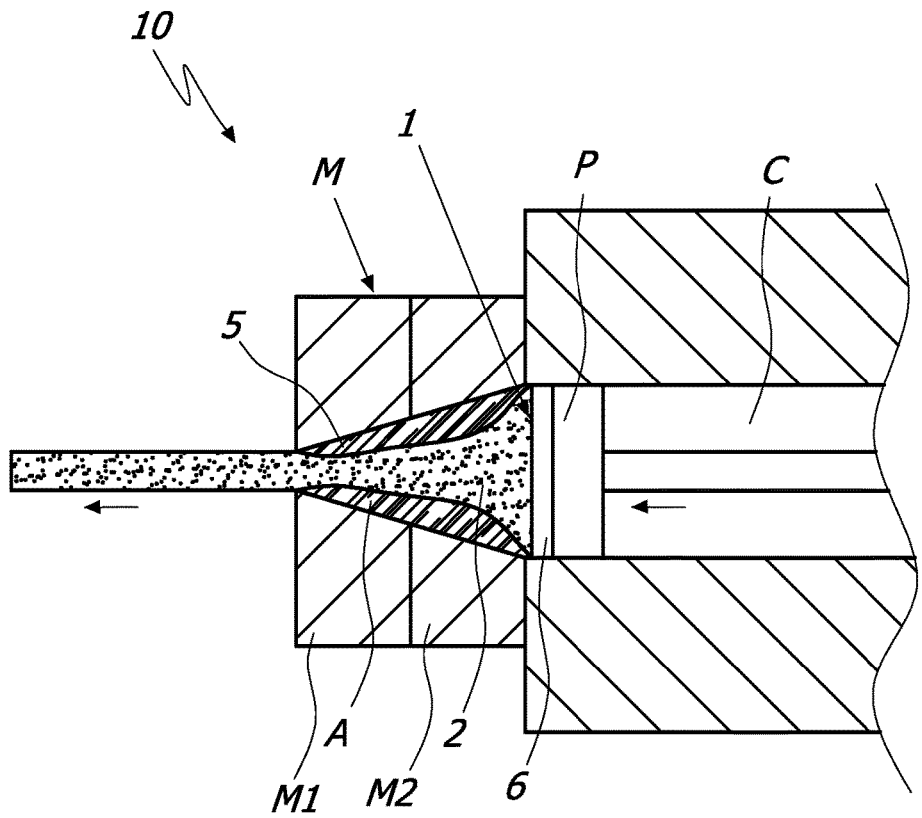
Figure 2:
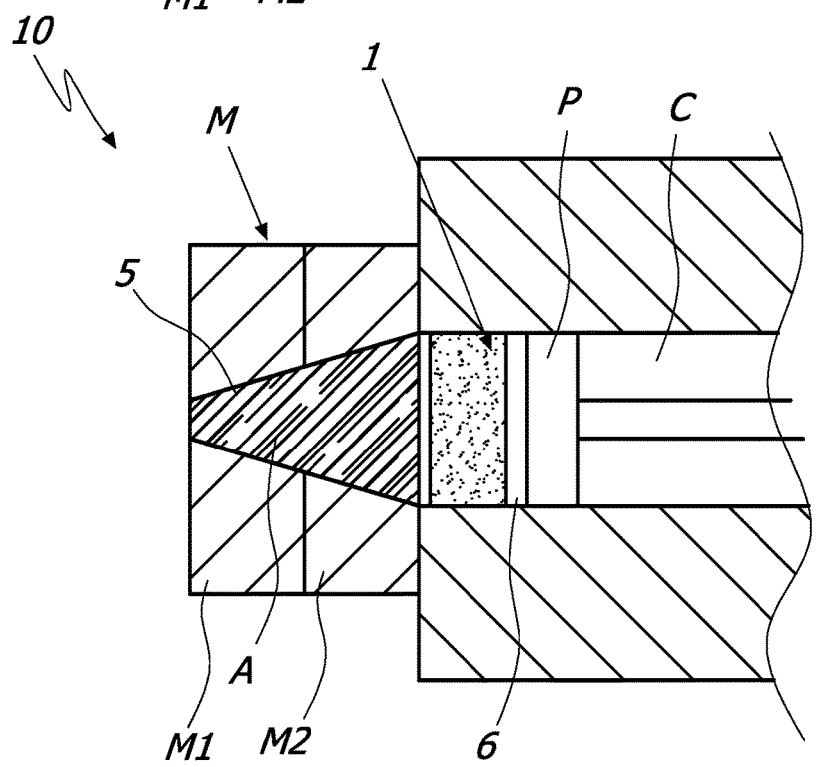
FIG. 2 is a section view of an extrusion head 10 according to a different embodiment.

Suitably, as shown in FIG. 1c, the plunger P may have a stroke such that the end-stroke thereof is in a position such as not to impact with the die. The part of the billet that remains unextruded contains all the surface impurities of the same billet and it is removed before the subsequent extrusion by means of a shearing not shown in the drawings.

Due to such a configuration, at the end of an extrusion process, the inner chamber of the die M may contain aluminium residues A that the plunger P is not able to extrude.

To allow the aluminium residues A to be recovered from the die M, a thrust member 1 may be used susceptible to be inserted in the chamber of the extrusion head 10, interposed between the plunger P and the same aluminium residues A, as shown in the annexed drawings.

To the object, the plunger P after having pressed the billet against the die M to extrude it, it may return to the start-stroke position so as to allow the user to insert the thrust member 1 in the chamber C.

Subsequently, as particularly shown in FIGS. 1a, 1b and 1c, the movement of the plunger P towards the die M pushes the thrust member 1 against the aluminium residues A, that in this way are pushed out from the extrusion die M and, thus, recovered.

According to a different embodiment, the thrust member 1 may be inserted in the extrusion head 10 with the aluminium billet. In particular, the thrust member 1 may be placed at the end of the billet on the opposite side with respect to the die M, so as the thrust member 1 thereof may remain interposed between the same billet and the plunger P.

In any case, the thrust member 1 may comprise at least one portion 2 made of a predetermined polymeric material, possibly coming from direct recycling or waste, faced to the extrusion die M. Possibly, the thrust member 1 may be entirely produced in polymeric material, preferably a recycled polymeric material.

During the moving step of the plunger P against the extrusion die M the portion 2 may reach a temperature and a working pressure such that the material of the portion 2 may be in plastic deformation or it may melt.

In this way, as particularly shown in FIG. 1b, as the aluminium residues A are pushed out from the extrusion die M, the plastically deformed or melted material takes the place thereof.

The thrust member 1 when inserted in the working chamber C may be at a predetermined temperature, for example by preheating it. In particular, such a temperature may be near or substantially equal to the above mentioned working temperature.

Alternatively, the thrust member 1 may be inserted "cold" in the working chamber C, for example at room temperature, and may be heated therein, for example by the heat of the same working chamber C.

According to another aspect of the invention, the thrust member 1 may be preheated at a temperature comprised between the working temperature and the room temperature, and placed in the working chamber C, that brings it to the above working temperature by the heat thereof.

To the object, the thrust member 1 may remain in the working chamber C for a predetermined period of time, so as the portion 2 of the same thrust member 1 reaches the working temperature thereof. The working temperature so as the material is in plastic deformation conditions is typical of the material, and, therefore, it varies according to the latter.

According to a different embodiment, the heating of the portion 2 of the thrust member 1 up to the working temperature may be accomplished by known heating means, for example by an oven.

Possibly, the portion 2 of the thrust member 1 may have a melting temperature substantially lower than the working temperature of the extrusion head. In particular, it may have a melting temperature lower than 500° C., more preferably lower than 400° C. so as to be able to melt during the extrusion process so as to flow out from the die M.

According to another preferred embodiment, the extrusion die containing residual aluminium may be removed from the press and placed substantially at the operative temperature in another auxiliary press wherein the cleaning method described in the present patent is accomplished. In this way, the main press is immediately available for a new profile, thus minimizing system downtime. Furthermore, it is possible to avoid dirtying the working chamber C with the polymeric material of the portion 2.

As better explained hereinafter, the thrust member 1 may be made of a polymeric material having chemical and/or physical properties such that during the moving step the same polymeric material does not leak through the gap between the peripheral wall of the working chamber C and the plunger P.

As mentioned above, the portion 2 of the thrust member 1 may be made of a polymeric material that may have a melt flow index according to the ISO 1133 of 0.1 to 12 g/10 min at a temperature of 220° C., preferably of 0.1 to 10 g/10 min.

Therefore, as already said, the working temperature may be such as to allow the portion 2 of the thrust member 1 to assume a plastic deformation behaviour or to melt at the operating temperature and pressure. In particular, such a temperature may exceed the glass transition temperature in case the portion 2 of the thrust member 1 comprises amorphous polymers or it may be lower than the HDT (heat deflection temperature) in case of semi-crystalline polymers.

In this manner, during the operating conditions of extrusion, the portion 2 of the thrust member 1 may have a plastic behaviour.

For example, the polymeric material may have a rheological behaviour described by the Carreau-Yasuda model according to the following parameters:

$$E = E_0 [1 + (T \xi \dot{\gamma})^a]^{(n-1)/a}$$

where:
E=viscosity (Pa·s);
$\dot{\gamma}$=shear rate (1/s);
a=2;

Tξ=time constant (s) of 0.1 to 10;
E$_0$=zero shear viscosity (Pa·s) of 500 to 100000;
n=power law index of 0.3 to 0.9.

The polymeric material may comprise one or more polymers based on polystyrene, polyolefin, ABS, PA, acrylic polymers, polymethacrylate, polycarbonate, polyester (PET) or polymers modified with acid anhydride (maleic anhydride).

More in particular, polymers based on polystyrene may include, for example, polystyrene, polystyrene-acrylonitrile copolymers, styrene-methylmethacrylate copolymers.

The polymers based on polyolefin may include, for example, polyethylene and/or polypropylene with α-olefins copolymers, preferably propylene and/or propylene copolymers. For example:

HDPE, with melt flow index lower than 1 g/10 minutes, for example 0.30-0.35 g/10 minutes;
PP (long chain branched polypropylene);
mixture of HDPE (80%-50%) with PP (20%-50%).

According to another aspect of the invention, the polymeric material may, for example, be made of glass-filled polycarbonate, polyurethane, polyisocyanurate, polyamide, polyetherimide, polyphenyl ether, polyphenyl sulfide or polysulfones.

According to another aspect of the invention, the polymeric material may comprise at least one filling load or filler. In particular, the polymer may comprise up to 60% by weight of fillers.

The filler constituting the filler may be of inorganic type, from a renewable source and/or ground thermosetting resins.

Suitably, the polymer may be loaded with graphite and/or alkaline metal salts and/or fluorinated polymers in order to improve the sliding between the thrust member 1 and the walls of the extrusion chamber.

According to a further aspect of the invention, the polymeric material may comprise flame retardants, for example hydrated aluminium oxide, ammonium polyphosphate and/or graphite, expanding and/or antioxidant agents.

The polymeric material may comprise or consist of a recycled polymeric material having the above mentioned features. In particular, the recycled polymer may also comprise polymers not previously described in lower percentages, for example lower than 20% by weight, more preferably lower than 10% by weight.

Suitably, the polymeric material may comprise at least 70% by weight with respect to the total weight thereof of one or more thermoplastic polymeric materials.

Thanks to such a feature, the polymer may be easily recovered and reused by grinding and reprinting.

According to another aspect of the invention, a cross-linking/curing agent that may be activated with temperature may be added to the polymeric material. As the temperature inside part 2 rises due to the conduction from the chamber C and due to the applied pressure, a cross-linking occurs with a consequent increase in viscosity that opposes the reduction thereof due to the increase of temperature.

Suitably, the cross-linking agent may also be partially replaced by the addition of a thermosetting resin in an amount up to 50% by weight, preferably up to 30% by weight, even more preferably up to 15% by weight.

Suitably, the polymeric material may have chemical and/or physical properties such as not to release significant quantities such as to require constructive precautions or in the working environment of toxic and/or fuel gases during the moving step, for example after the working temperatures and/or chemical reactions with the residual aluminium and/or materials of the system. In this way, the risk of forming mixtures of detonating gases, in particular inside the working chamber C, may be avoided.

Advantageously, the polymeric material upon the reciprocal moving step of the thrust member 1 and of the die M may have a water content lower than 7% by weight with respect to the total weight of the polymeric material, preferably lower than 5% by weight and even more preferably lower than 2% by weight with respect to the total weight of the polymeric material.

Thanks to such features the integrity of the extruded aluminium is preserved and, more generally, problems during the extrusion step are avoided. In fact, at high temperatures, aluminium reacts with water with the formation of oxides.

Suitably, when the plunger P is in the end-stroke position, the material of the portion 2 of the thrust member 1 may almost completely occupy the inside of the chamber of the die M.

In order to at least partially remove the residual aluminium A, the thrust member 1 may have a volume such as to occupy the inner chamber of the die M, that is a volume substantially equal to the volume of the residual metal A to be recovered.

In this way, during the moving step, the thrust member 1 may exert a thrust on the residual aluminium A in the die M so as to at least partially remove the former from the latter.

Ideally, therefore, at the end of the moving step all the residual aluminium A flows out from the die M, and the volume thereof is occupied by the material of the portion 2 of the thrust member 1.

On the other hand, it is possible that the residual aluminium A flows out only partially from the die M. For example, as particularly shown in FIG. 1c, the material of the portion 2 of the thrust member 1 may only remove a central area of the residual aluminium mass A, and, once a central channel has been formed, from the die M, instead of aluminium, material of the portion 2 of the thrust member 1 begins to flow out.

Suitably, the moving step may be interrupted when the material of the thrust member 1 flows out from the extrusion head, that is from the die M.

According to a further aspect of the invention, a recovering step of the residual metal A flowing out from the extrusion die M may be provided. For example, as secondary aluminium.

To the object, the material of the portion 2 of the thrust member 1 and the residual aluminium A may be substantially immiscible so as not to bind to each other during the flowing out from the extrusion die M and to prevent the subsequent recycling of the materials.

Moreover, the cleaning of the die may provide a step of opening of the die after the moving step of the thrust member 1.

Thanks to such a feature, it is possible to recover the residual aluminium A and/or the polymeric material not flowed out from the die M during the moving step.

In particular, in order to facilitate the removal of the residual polymeric material, the same material may be melted and/or carbonized by means of systems of a per se known type.

More in detail, the polymeric material inside the extrusion die M after a time period (for example an interval of 20-40 seconds) may reach a temperature such as to allow the melting of the polymeric material thereof.

In this way, in order to recover the polymeric material, it may be sufficient to rotate the extrusion die M so as to allow the polymer material to flow out therefrom by simple gravity.

Such further recovering step may be accomplished with a mechanic action, for example a sanding, and/or a chemical action by washing with a chemical agent, for example a mixture of water and sodium hydroxide.

In particular, thanks to the moving step of the thrust member 1, the amount of residual aluminium A in the die may be greatly reduced so as to allow a user to open the die M, for example the parts M1, M2, forming the die, may be separated.

Such a feature is particularly advantageous when the die M is formed by different parts M1, M2 and/or the inner chamber 5 has a non-linear geometry, for example with undercuts.

In this way, in fact, the washing step with a chemical agent may be accomplished quickly and cheaply. For example, a smaller amount of basic agent may be used.

Possibly, a further processing step of the die M may be provided, for example surface treatments to prepare the die M to a new extrusion process.

The plunger P in the end-stroke position may be slightly spaced apart from the die M of a few centimetres, with a consequent formation of an aluminium disk outside the die M upon the return thereof towards the starting position. The aluminium disk is generally removed by mechanic action, for example a cutting action (the so-called "shearing") in order to recover it. Such a shearing operation is of a per se known type in the field.

Moreover, according to an aspect of the invention, the thrust member 1 may have a substantially disk-like shape and it may have a diameter substantially equal to or lower than the diameter of the extrusion chamber C.

From what has been described above, it is evident that the invention fulfils the intended objects. The invention is susceptible of numerous modifications and variations. All the details may be replaced by other technically equivalent elements, and the materials may be different according to requirements, without departing from the scope of protection of the invention defined by the appended claims.

The invention claimed is:

1. A method of cleaning an extrusion die from residual metal remaining therein as result of one or more extrusion processes at a temperature below 600° C. and of recovering the residual metal, the method comprising the steps of:
   providing the extrusion die formed by at least two parts separable from each other;
   providing a thrust member in correspondence of the extrusion die, said thrust member comprising at least one portion directly faced to said extrusion die and made of a polymeric material;
   after extruding a metal through said extrusion die, reciprocally moving said thrust member and said extrusion die so as to cause a thrusting action of the thrust member on the residual metal and at least a partial flowing out of the residual metal from the extrusion die;
   after reciprocally moving said thrust member and said extrusion die, recovering the residual metal flowed out from the extrusion die;
   removing the polymeric material not flowed out of the extrusion die during the step of reciprocally moving;
   mechanically and/or chemically removing the residual metal not flowed out from the extrusion die during said step of reciprocally moving; and
   opening the extrusion die;
   wherein said polymeric material upon said reciprocally moving of said thrust member and said extrusion die has a water content lower than 7% by weight with respect to a total weight of the polymeric material; and
   wherein, during said step of reciprocally moving, said at least one portion is at least partially in a plastic deformation condition or melted so as the at least one portion occupies a volume of the residual metal flowed out of the extrusion die.

2. The method according to claim 1, wherein said polymeric material has chemical and/or physical properties such as not to release toxic and/or fuel gases during said step of reciprocally moving.

3. The method according to claim 1, wherein said thrust member is interposed between said extrusion die and a plunger, the plunger being inserted in a working chamber, said polymeric material having chemical and/or physical properties such that during the step of reciprocally moving, the polymeric material does not leak through a gap between a peripheral wall of the working chamber and the plunger.

4. The method according to claim 1, wherein said at least one portion of said thrust member has a volume at least equal to the volume of the residual metal to be recovered.

5. The method according to claim 1, further comprising, before the step of reciprocally moving, a preheating step of said thrust member at a temperature lower than a melting point of said polymeric material.

6. The method according to claim 1, wherein said polymeric material comprises one or more polymeric thermoplastic materials, the one or more polymeric thermoplastic materials being at least 70% by weight with respect to a total weight of said polymeric material.

7. The method according to claim 1, wherein said polymeric material is selected from the group consisting of polystyrene, polyolefins, ABS, styrene acrylonitrile, PA, acrylate polymers, polymethacrylate, polycarbonates, polyesters, PET, PBT, polymers modified with acid anhydride.

8. The method according to claim 1, wherein said polymeric material comprises at least one crosslinking agent and/or curing agent.

9. The method according to claim 1, wherein said polymeric material comprises at least one thermosetting polymer.

10. The method according to claim 1, wherein the step of reciprocally moving is stopped when said polymeric material flows out from said extrusion die.

11. The method according to claim 1, wherein said one or more extrusion processes are performed by a first press, the method comprising a step of moving said extrusion die from said first press to a second press comprising said thrust member to carry out the step of reciprocally moving said thrust member and said extrusion die.

12. The method according to claim 1, wherein the step of removing of the polymeric material not flowed out from the extrusion die is accomplished by melting and/or carbonization of the polymeric material.

* * * * *